Sept. 3, 1940. L. M. GILL 2,213,837
CHILD'S EATING DISH
Filed May 26, 1937

INVENTOR.
Lester M. Gill
BY
       G. Campbell
ATTORNEY.

Patented Sept. 3, 1940

2,213,837

UNITED STATES PATENT OFFICE 2,213,837

CHILD'S EATING DISH

Lester M. Gill, New Rochelle, N. Y.

Application May 26, 1937, Serial No. 144,776

1 Claim. (Cl. 65—15)

My invention relates to an improvement in a child's eating dish and the novelty consists in the combination and arrangement of parts as will be more fully hereinafter pointed out.

It has always been a problem with many children to get them to eat a sufficient quantity and also the right kind of food.

My device solves this problem by concealing a dessert or reward so that not only it cannot be seen but also it cannot be reached until the required food has been first consumed.

Referring to the drawing, Figure 1 is a vertical sectional elevation of one embodiment of my device.

Figure 1:
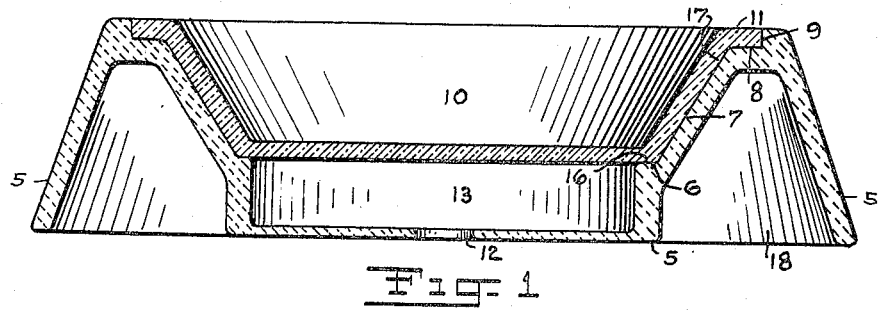

In the drawing as shown in Figure 1, a base 5 constructed preferably of Bakelite or some suitable similar heat insulating material has an inner circular seat 6, an outwardly flaring wall 7, an upper circular seat 8 and a vertical circular lip 9 extending therefrom which is adapted to receive a dish 10 and preferably of transparent glass having a circular bottom 16, the edge of which rests on the seat 6 and which has a flaring side wall 17 which rests on the wall 7 and a circular lip 11 extending therefrom which rests on the seat 8 and the outer periphery of which engages snugly against the vertical lip 9. The base 5 has a circular cut out portion 18 and a circular finger hole 12 in the center of the bottom to enable one on lifting the base 5 and dish 10 resting therein to push a finger up through 12 so as to lift said dish 10 out of said base 5. A space 13 in the base 5 and between the base 5 and the bottom of the dish 10 serves as a space in which to place a special dessert or small toy, picture or anything of interest to a child.

Figure 2:
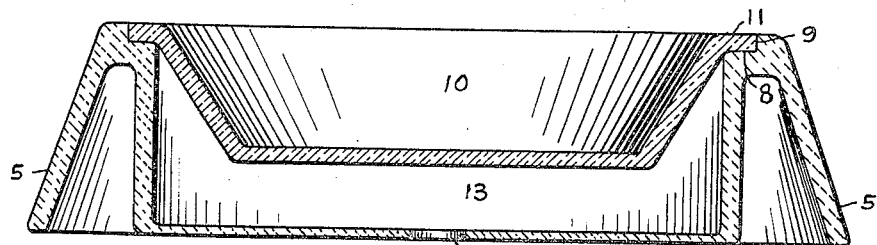
Figure 2 is a vertical sectional elevation of a second embodiment of my device.

In Figure 2 the dish 10 rests in the base 5 by means of the circular lip 11 resting on the circular seat 8 so that the outer periphery of the lip 11 fits snugly against the vertical lip 9.

Figure 3:
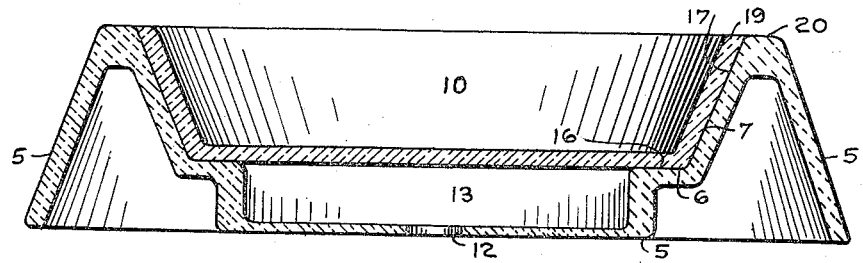
Figure 3 is a vertical sectional elevation of a third embodiment of my device.

In Figure 3 the dish 10 rests as to its circular bottom 16 on the circular seat 6 of base 5 and the flaring wall 17 fits snugly against the flaring wall 7 of the base 5 and the upper circular rim 19 of the dish 10 is exactly even with the upper circular rim 29 of the base 5.

Figure 4:
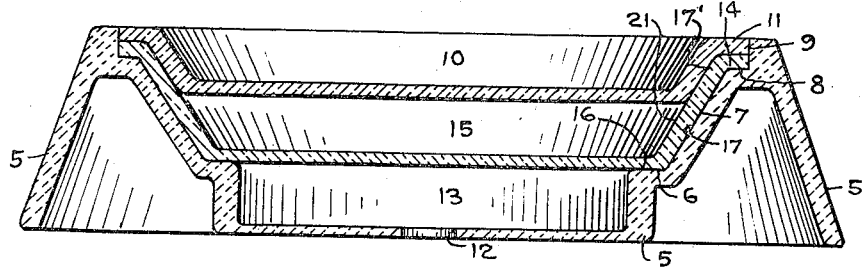
Figure 4 is a vertical sectional elevation of a fourth embodiment of my device.

In Figure 4 an inner circular dish 15 is adapted to rest as to its circular bottom 16 on the circular seat 6 of the base 5 and the sloping wall 17 of said dish 15 rests against the flaring wall 7 of the base 5 and the upper circular lip 14 of the dish 15 rests on the circular seat 8. A second dish 10 of shallower construction has a circular flaring side wall 17' which rests against the inside flaring wall 21 of the dish 15 so as to rest snugly against the same and the circular lip 11 of dish 10 rests on the circular lip 14 of dish 15 so that the outer periphery of the lip 11 fits snugly against the circular vertical lip 9 of the base 5.

It will be noted that the space 13 in which to place the reward for the child is common to all four forms as shown in these four different figures.

In Figure 4 the dish 10 is adapted to hold the food which the child is required to eat and the dish 15 to hold the dessert or second form of food.

In all of these various forms the dish 10 may be removed by lifting the base 5 and pushing the finger up through the opening 12 whereby the dish 10 may be lifted out as these fit the base snugly in order that the child may not be able to remove the same until the food contained therein has been eaten when the attendant may lift out this dish 10 as described so as to enable the child to secure the reward which is contained in 13.

It will be noted that the base 5 is constructed with the sloping sides so that the child cannot lift the base and the dish 10 is fitted so snugly in the base 5 that the removal of the dish by the child is also impossible. The base 5 having the substantial rim portion 20 around the top serves as an insulation against the burning of the child on the dish 10 if it is hot.

The sides of the dish 10 and 15 are made flaring so that the child cannot lift the dish out of the base 5.

The dish 10 may be made of any suitable transparent material such as an ovenware glass like Pyrex.

The use of transparent glass in the dish 10 adds a stimulation to the eating by the child so as to see what is under the glass which cannot be seen until the dish has been emptied so that this can be made a constant stimulation to the eating by the average child who needs encouragement in finishing the food in the dish set before it.

It will be apparent that a dish made of metal or any other suitable material may be used and that the shape of the dish and base may be varied to suit the particular requirements.

The combination of the base of a heat insulating material holding a dish in a manner to insulate and protect the user from contact with the edge of the heated dish is of marked advantage in the use of any unusually heated dish served to the diner such as for example a sizzling platter.

I claim:

In combination a base of a material which insulates against hot and cold and having a countersunk shoulder immediately below its upper edge, a rigid transparent dish adapted to snugly fit into said base and rest on said countersunk shoulder so that the upper edge of said dish is flush with the upper edge of said base, a storage space between the bottom of said dish and said base and a finger opening in the bottom of said base to facilitate the removal of said dish from said base.

LESTER M. GILL.